United States Patent
Chang et al.

(10) Patent No.: US 10,565,461 B2
(45) Date of Patent: Feb. 18, 2020

(54) LIVE FACIAL RECOGNITION METHOD AND SYSTEM

(71) Applicant: Wistron Corporation, New Taipei (TW)

(72) Inventors: Yao-Tsung Chang, New Taipei (TW); Yin-Yu Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 213 days.

(21) Appl. No.: 15/837,438

(22) Filed: Dec. 11, 2017

(65) Prior Publication Data

US 2019/0114495 A1    Apr. 18, 2019

(30) Foreign Application Priority Data

Oct. 16, 2017  (TW) .............................. 106135308 A

(51) Int. Cl.
*G06K 9/00* (2006.01)
*G01J 5/10* (2006.01)
(Continued)

(52) U.S. Cl.
CPC ............ *G06K 9/00906* (2013.01); *G01J 5/10* (2013.01); *G06F 16/5838* (2019.01); *G06F 21/32* (2013.01); *G06K 9/00255* (2013.01); *G06K 9/00268* (2013.01); *G06K 9/00281* (2013.01); *G06K 9/00288* (2013.01); *G01J 5/0025* (2013.01); *G01J 2005/0077* (2013.01);
(Continued)

(58) Field of Classification Search
CPC ........... G06K 9/00906; G06K 9/00288; G06K 9/00268; G06K 9/00255; G06K 2009/00939; G06K 2009/00328; G06K 9/00281; G06F 16/5838; G06F 21/32; G01K 13/004; G01K 13/002; G01J 5/00; G01J 5/10; G01J 5/0025; G01J 2005/0077
USPC ........................................................ 382/118
See application file for complete search history.

(56) References Cited

U.S. PATENT DOCUMENTS 6,173,068 B1   1/2001  Prokoski
6,996,256 B2   2/2006  Pavlidis
(Continued)

FOREIGN PATENT DOCUMENTS

TW   201033907 A   9/2010
TW   201401186 A   1/2014

OTHER PUBLICATIONS

Gang Pan, et al., "Liveness Detection for Face Recognition," Recent Advances in Face Recognition, ISBN 978-953-7619-34-3, pp. 236, Dec. 2008.
(Continued)

*Primary Examiner* — Van D Huynh
(74) *Attorney, Agent, or Firm* — Donald E. Stout; Stout, Uxa & Buyan, LLP

(57) ABSTRACT

A live facial recognition method and system includes capturing a visual image and obtaining temperature information of a person under recognition, and deriving facial features according to the visual image; comparing the facial features of the visual image with corresponding facial features of a facial feature database to obtain a difference therebetween; determining whether facial temperature conforms to a live facial recognition criterion according to the temperature information, if the difference is less than a predetermined threshold value.

18 Claims, 8 Drawing Sheets

(51) Int. Cl.
G06F 21/32 (2013.01)
G06F 16/583 (2019.01)
G01J 5/00 (2006.01)

(52) U.S. Cl.
CPC .............. G06K 2009/00328 (2013.01); G06K 2009/00939 (2013.01)

(56) References Cited

U.S. PATENT DOCUMENTS

| | | | |
|---|---|---|---|
| 9,202,105 B1 | 12/2015 | Wang et al. | |
| 2003/0108223 A1* | 6/2003 | Prokoski | A61B 5/1176 382/115 |
| 2006/0102843 A1 | 5/2006 | Bazakos et al. | |
| 2010/0128938 A1* | 5/2010 | Chung | G06K 9/00255 382/117 |
| 2012/0148118 A1* | 6/2012 | Lee | G06K 9/00362 382/118 |
| 2013/0342703 A1* | 12/2013 | Lin | H04N 5/33 348/164 |
| 2014/0099005 A1* | 4/2014 | Mogi | G06K 9/00288 382/118 |
| 2018/0039845 A1* | 2/2018 | Chen | G06K 9/00906 |

OTHER PUBLICATIONS

Francine J. Prokoski et al., "Infrared Identification of Faces and Body Parts," Biometrics, 191-212. 10.1007/0-306-47044-6_9, 2006.

Thirimachos Bourlai et al., "A Study on Using Mid-Wave Infrared Images for Face Recognition," Sensing Technologies for Global Health, Military Medicine, Disaster Response and Environmental Monitoring II,and Biometric Technology for Human Identification IX, Proc. of SPIE vol. 8371 83711K-1, http://spiedigitallibrary.org/, 2012.

Y. Yoshitomi et al., "Facial Expresiion Recognition Using Thermal Image Processing and Neural Network," Proc. of 6th IEEE International Workshop on Robot and Human Communication, 1997.

Office Action Dated Jan. 22, 2018 in corresponding Taiwan Patent Application No. 106135308.

* cited by examiner

LIVE FACIAL RECOGNITION METHOD AND SYSTEM

CROSS-REFERENCE TO RELATED APPLICATIONS

This application claims priority of Taiwan Patent Application No. 106135308, filed on Oct. 16, 2017, the entire contents of which are herein expressly incorporated by reference.

BACKGROUND OF THE INVENTION

1. Field of the Invention

The present invention generally relates to facial recognition, and more particularly to a live facial recognition method and system.

2. Description of Related Art

Facial recognition is computer image processing capable of identifying facial features from a digital image or a video frame, and could be used as a security measure. Facial recognition is one of biometrics such as fingerprint or eye iris recognition. Facial recognition may be adapted to electronic devices such as computers, mobile phones and card readers. Particularly, as mobile devices are becoming more popular, the security measure is in high demand.

A conventional facial recognition system uses a two-dimensional (2D) camera to capture an image, from which facial features are extracted and compared with a database. However, the conventional facial recognition system usually cannot distinguish a real person from a picture while performing recognition, becoming a security loophole to be exploited.

In order to enhance reliability of the security measure, a facial recognition system is proposed to ask a user to act according to a given instruction such as swinging or rotating head, opening mouth or closing eyes. Further, some images may be captured while the user is acting on instruction, and accordingly depth information may be obtained and used to identify a real person. Nevertheless, those schemes take time and cause inconvenient.

A need has thus arisen to propose a novel facial recognition scheme capable of maintaining or enhancing reliability of the security measure, and accelerating facial recognition with convenience.

SUMMARY OF THE INVENTION

In view of the foregoing, it is an object of the embodiment of the present invention to provide a live facial recognition method and system capable of quick recognizing a face accurately and conveniently.

According to one embodiment, a visual image and temperature information of a person under recognition are captured, and facial features are derived according to the visual image. The facial features of the visual image are compared with corresponding facial features of a facial feature database to obtain a difference therebetween. If the difference is less than a predetermined threshold value, it determines whether facial temperature conforms to a live facial recognition criterion according to the temperature information.

DETAILED DESCRIPTION OF THE INVENTION

Figures 1, 2A, 2B:
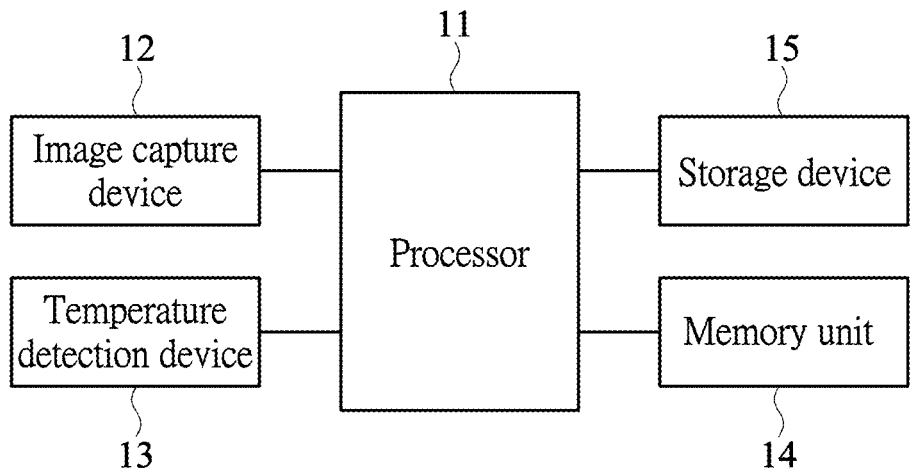
FIG. 1 shows a block diagram illustrating a live facial recognition system according to one embodiment of the present invention.
FIG. 2A shows an exemplary pixel arrangement of an image sensor in a 2D camera.
FIG. 2B shows an exemplary pixel arrangement of an image sensor in a red-green-blue and infrared (RGB-IR) camera.

FIG. 1 shows a block diagram illustrating a live facial recognition system 100 according to one embodiment of the present invention. The live facial recognition system ("recognition system" hereinafter) 100 of the embodiment may include a processor 11, an image capture device 12, a temperature detection device 13, a memory unit 14 and a storage device 15. Specifically, the processor 11 (e.g., a digital image processor) may include circuitry such as an integrated circuit. The image capture device 12, controlled by the processor 11, may be configured to capture an image of a person under test. The image capture device 12 may be a two-dimensional (2D) camera for capturing a 2D image. Alternatively, the image capture device 12 may be a three-dimensional (3D) camera for obtaining depth information in addition to a 2D image. In one example, the 3D camera may be composed of two lenses with disparity, according to which the depth information may be obtained. In another example, the 3D camera may be composed of a 2D camera and a depth detection device.

In the embodiment, the temperature detection device 13, controlled by the processor 11, may be configured to detect temperature in a specific area in order to obtain temperature information. The temperature detection device 13 may include a temperature sensor array (e.g., an infrared temperature sensor array) that is capable of obtaining a temperature image representing the temperature information of an entire face. The temperature sensor array is also called a temperature camera (e.g., an infrared camera) in this specification. Alternatively, the temperature detection device 13 may include a single temperature sensor (e.g., an infrared temperature sensor or an infrared thermometer) that is capable of detecting plural temperature data representing the temperature information at specific points of a face. The single temperature sensor may adopt remote sensing to detect one point at a time. In one embodiment, the temperature detection device 13 is embedded in the image capture device 12 (i.e., the image capture device 12 and the temperature detection device 13 are integrated), and therefore the temperature information and the visual image can be obtained at the same time. FIG. 2A shows an exemplary pixel arrangement of an image sensor in a 2D camera, illustrating red pixels (R), green pixels (G) and blue pixels (B) arranged in Bayer array. FIG. 2B shows an exemplary pixel arrangement of an image sensor in a red-green-blue and infrared (RGB-IR) camera, illustrating infrared pixels (IR) interposed among red pixels (R), green pixels (G) and blue pixels (B) together arranged in Bayer array.

In the embodiment, the memory unit 14 may be configured to store a computer program and data for executing the computer program, by which the processor 11 may perform live facial recognition. The memory unit 14 may include a random access memory such as a dynamic random access memory (DRAM), a static random access memory (SRAM) or other memory units suitable for storing a computer program. The storage device 15 of the embodiment may be configured to store a database adaptable to live facial recognition. The storage device 15 may include a hard disk, a solid state disk (SSD) or other storage devices suitable for storing a database.

Prior to live facial recognition, a facial feature database should be generated through registry and modeling. Afterwards, live facial recognition may be performed by comparing the facial features of a person under recognition with the facial feature database.

Figure 3:
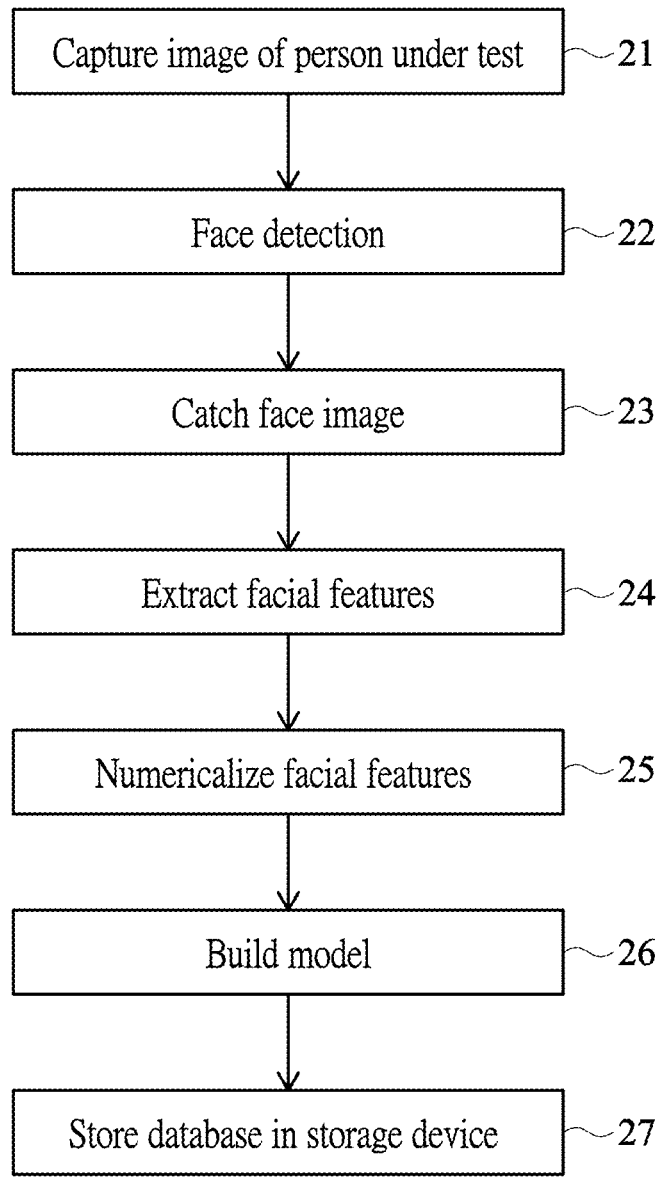
FIG. 3 shows a flow diagram illustrating a method of generating a database.
Figure 4:
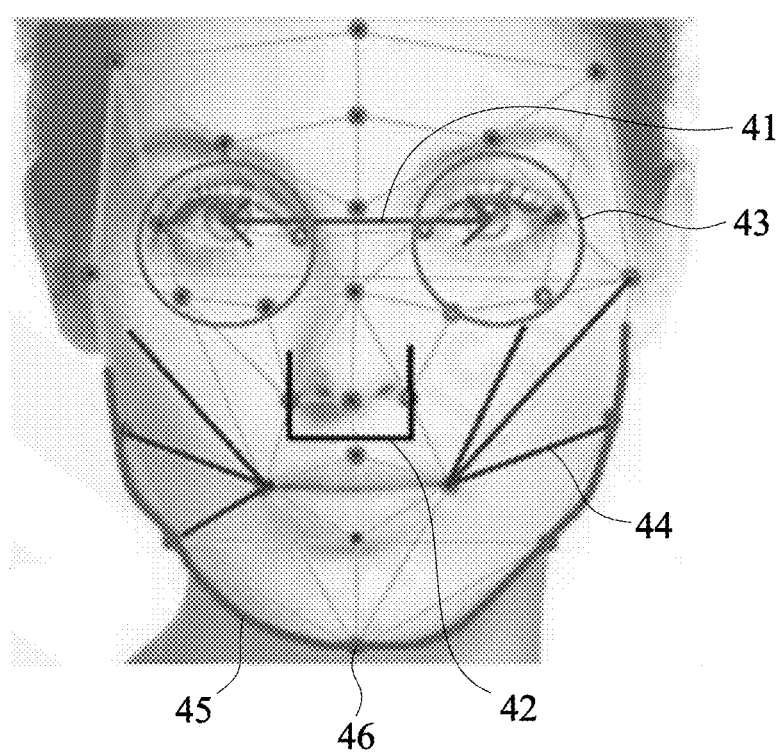
FIG. 4 shows exemplary facial features according to one embodiment of the present invention.

FIG. 3 shows a flow diagram illustrating a method 200 of generating a database. Specifically, in step 21, the image capture device 12 may capture an image of a person under test. Next, in step 22, the processor 11 may perform face detection on the captured image. In step 23, a face image (i.e., an image substantially covering a facial contour) may be caught from the captured image according to results of the face detection. Subsequently, in step 24, the processor 11 may extract or derive facial features from the face image. FIG. 4 shows exemplary facial features according to one embodiment of the present invention, including a distance 41 between the eyes, a width 42 of the nose, depth 43 of an eye socket, a structure 44 of cheekbones, a length 45 of a jaw line, and a chin point 46. As exemplified in FIG. 4, the facial features may be composed of lines, circles, rectangles, triangles, etc. Facial recognition may be performed according to connecting lines, distances and angles between feature points. In another embodiment, facial features may include fewer or more entries.

In step 25, the processor 11 may numericalize the facial features to generate facial feature values. Next, in step 26, a model is built according to the facial feature values, and a facial feature database is accordingly generated and stored in the storage device 15 (step 27).

Figure 5:
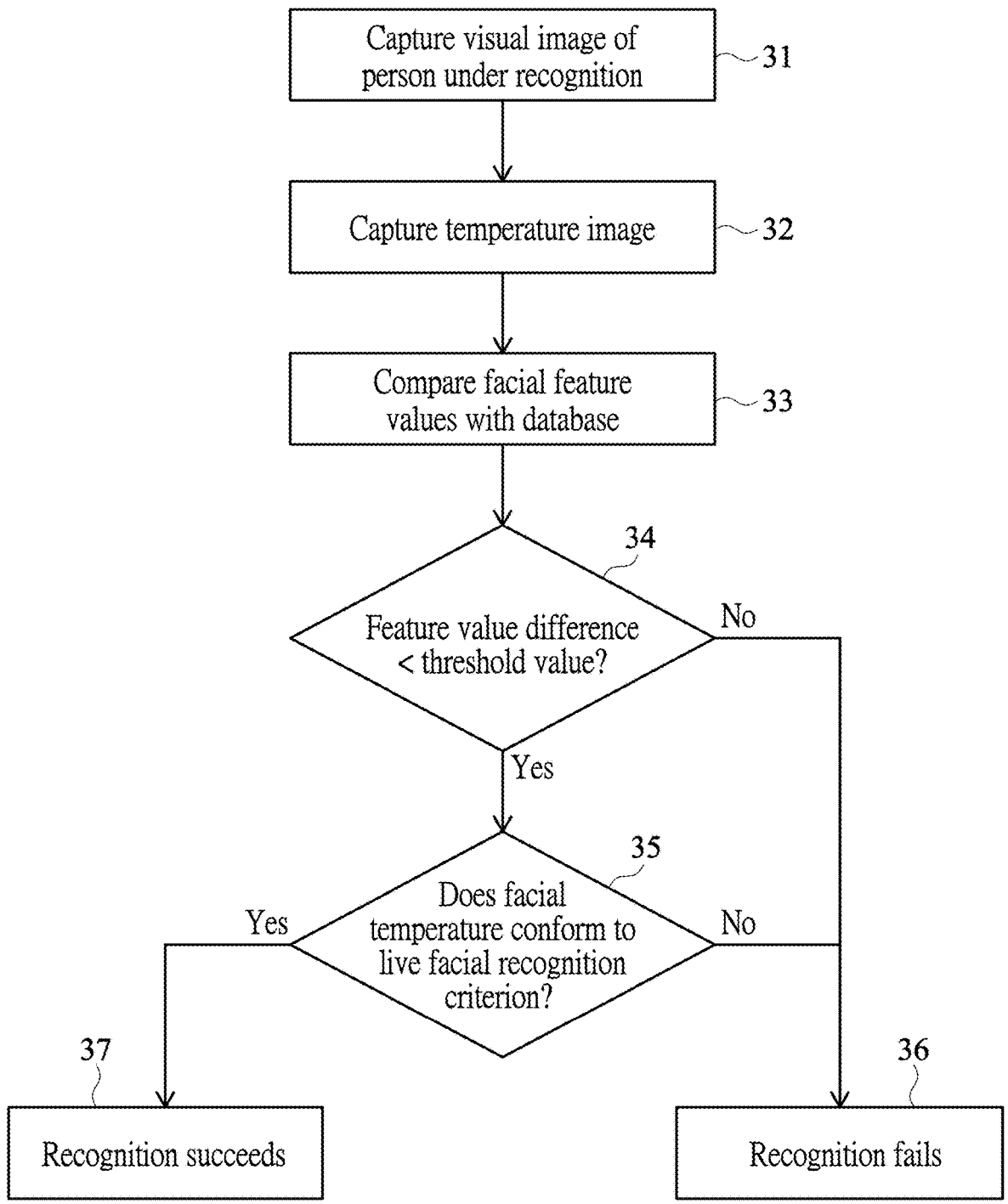
FIG. 5 shows a flow diagram illustrating a live facial recognition method according to a first embodiment of the present invention.

FIG. 5 shows a flow diagram illustrating a live facial recognition method 300 according to a first embodiment of the present invention. In step 31, the image capture device 12 (e.g., a color camera) may capture a visual image (e.g., a color image) of a person under recognition, according to which facial feature values may be obtained. The facial feature values may be obtained in a manner similar to steps 22-25 of FIG. 3. Briefly speaking, the processor 11 may perform face detection on a captured visual image, catch a face image, extract plural facial features, and then numericalize the facial features to generate the facial feature values.

In step 32, the temperature detection device 13 (in the embodiment, a temperature camera such as an infrared camera) may capture a temperature image (e.g., an infrared image) of the person under recognition. In the embodiment, the temperature detection device 13 is separate from the image capture device 12, and the temperature image may represent the temperature information. In general, step 32 may be performed at any time prior to step 35. The information obtained by the temperature camera (e.g., the infrared camera) may be transformed into the temperature image. For example, intensity of an infrared detection value may be transformed into a corresponding temperature.

In step 33, the facial feature values of the person under recognition are compared with a facial feature database (database for short). If a difference between the facial feature values of the person under recognition and corresponding facial feature values of the database is not less than a predetermined threshold value (step 34), indicating that they have substantially different facial features (i.e., a facial feature error is outside an acceptable range), the facial recognition fails (step 36).

On the contrary, if a difference between the facial feature values of the person under recognition and corresponding facial feature values of the database is less than the predetermined threshold value (step 34), indicating that they have substantially similar facial features (i.e., a facial feature error is inside an acceptable range), the flow then goes to step 35.

According to one aspect of the embodiment, in step 35, it determines whether facial temperature of the person under recognition conforms to a live facial recognition criterion. If the determination of step 35 is negative, the facial recognition fails (step 36); if the determination of step 35 is positive, the facial recognition succeeds (step 37).

Figure 6:
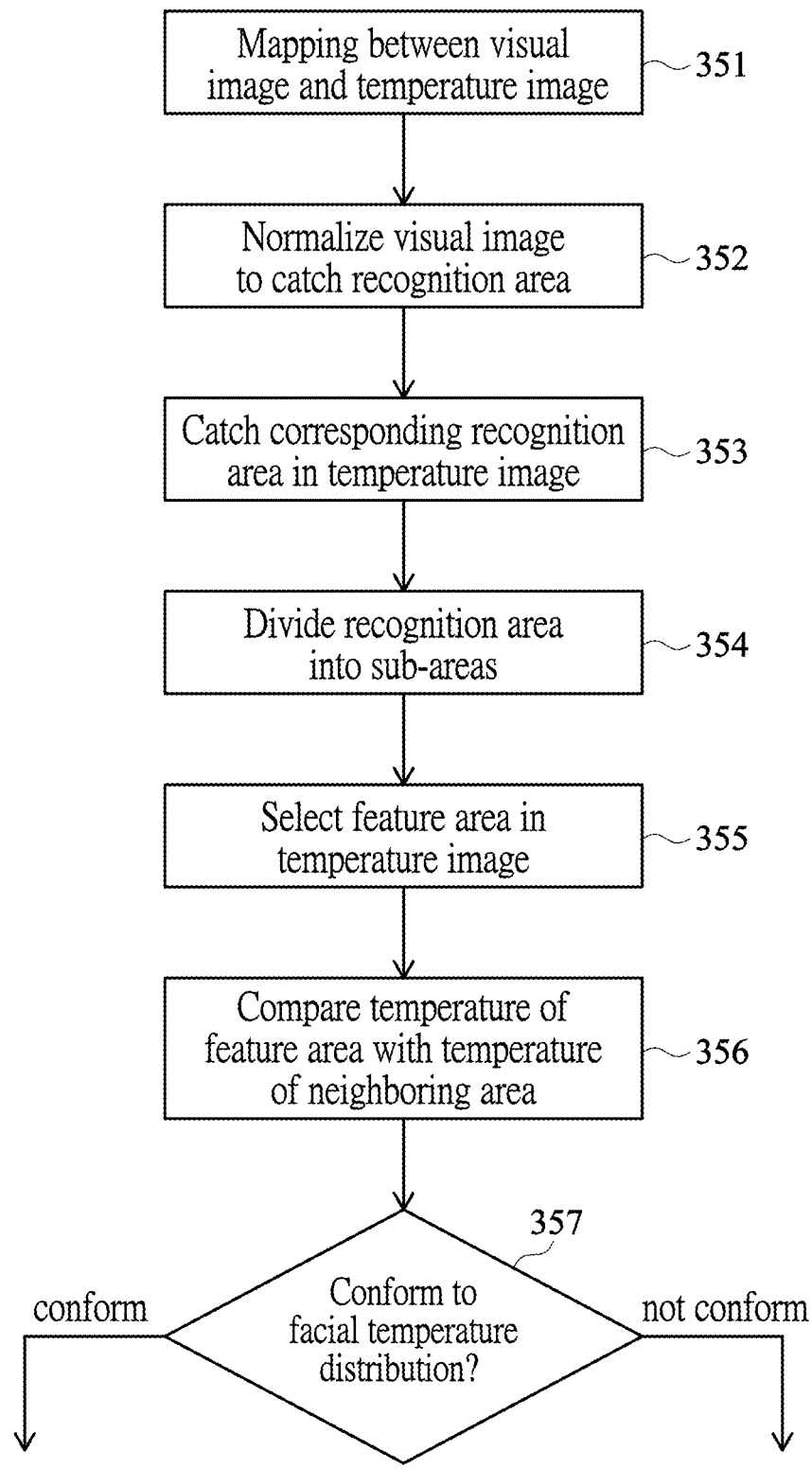
FIG. 6 shows a detailed flow diagram of the live facial recognition criterion of FIG. 5.

FIG. 6 shows a detailed flow diagram of the live facial recognition criterion (step 35) of FIG. 5. In step 351, mapping is performed between the visual image (from the image capture device 12) and the temperature image (from the temperature detection device 13). Specifically, a common reference point of the visual image and the temperature image is first determined, and magnifications of the visual image and the temperature image are then determined according to their capture angles respectively. Accordingly, pixels of the visual image and the temperature image may be correspondingly mapped.

Subsequently, in step 352, the visual image may be normalized to catch a recognition area. In one example, a recognition area (e.g., a rectangular area) that substantially covers a facial contour may be caught in the visual image. For example, a rectangular recognition area is defined by two horizontal lines respectively passing top facial contour edge and bottom facial contour edge and two vertical lines respectively passing right facial contour edge and left facial contour edge. In another example, a recognition area is caught by removing pixels with temperature being lower than an average temperature in the temperature image. If it determines that the person under recognition wears a mask (which causes temperature below the nose to be lower than temperature at the nose) or wears glasses (which causes temperature at the eyes to be lower than temperature at the nose), the corresponding area may also be removed.

In step 353, a corresponding recognition area is caught in the temperature image according to the mapping relationship between the visual image and the temperature image. In step 354, the recognition area of the temperature image is divided into sub-areas (e.g., 5×5 sub-areas). In another example, sub-areas may be obtained according to feature points shown in FIG. 4. For example, a triangular sub-area may be defined by three adjacent feature points, and a rectangular sub-area may be defined by four adjacent feature points.

In step 355, a feature area (that includes at least one sub-area) is selected in the visual image, and a corresponding feature area is then obtained in the temperature image. For example, a feature area of the temperature image that includes at least one sub-area covering a face organ (e.g., the nose) is obtained. Subsequently, in step 356, it compares temperature of the feature area of the temperature image with temperature of at least one neighboring sub-area. The at least one neighboring sub-area may include a top neighboring sub-area and a bottom neighboring sub-area; a top neighboring sub-area, a bottom neighboring sub-area, a left neighboring sub-area and a right neighboring sub-area; three top neighboring sub-areas and three bottom neighboring sub-areas; or eight neighboring sub-areas along eight directions respectively. In this specification, temperature of an area may refer to a mean temperature or a medium temperature of the area, or may refer to a mean value, a maximum value or a minimum value of some intermediate temperatures.

Finally, in step 357, if comparing result (of step 356) conforms to predetermined (or normal) facial temperature distribution, the live facial recognition criterion is asserted or conformed. In this specification, the predetermined facial temperature distribution may refer to a mean value or a medium value among plural people, or may refer to a mean value of some intermediate values among plural people. Take the feature area covering the nose as an example, normal facial temperature distribution is conformed if temperature of the feature area is lower than temperature of neighboring sub-area. To the contrary, normal facial temperature distribution is not conformed if temperature of the feature area is higher than temperature of neighboring sub-area. In the embodiment, the predetermined facial temperature distribution (step 357) may include one or more of the following requirements:

Facial temperature is higher than ambient temperature;
Temperature above eyes is higher than temperature below the eyes;
Above the eyes, eyebrow temperature is lower than temperature of other area;
Below the eyes, nose temperature is lower than temperature of other area;
The facial temperature is higher than 28° C. ;
Eye temperature (about 35° C.) is the highest in a face;
Nose temperature is the lowest in the face;
Temperature above nose is higher than temperature below the nose;
Temperature of the eyes with glasses is lower than other temperature in the face, but higher than the ambient temperature.

Figure 7:
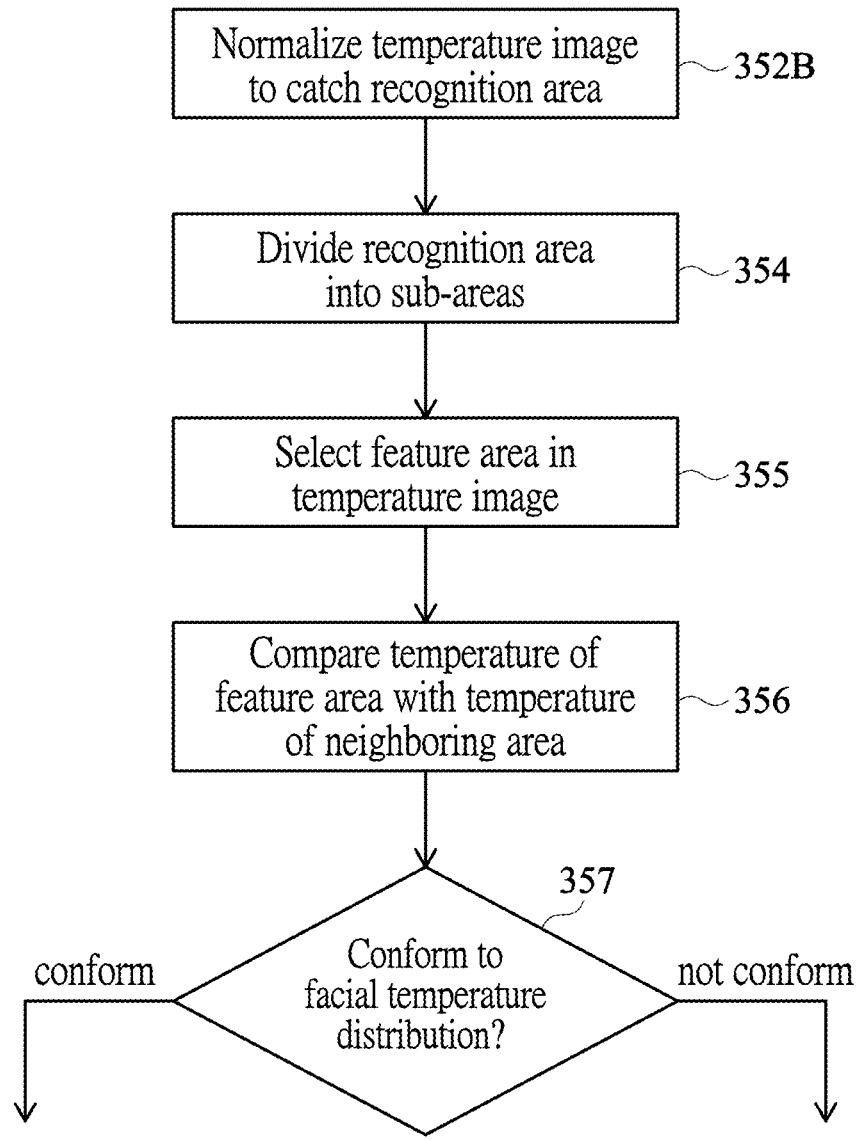
FIG. 7 shows another detailed flow diagram of the live facial recognition criterion of FIG. 5.

FIG. 7 shows another detailed flow diagram of the live facial recognition criterion (step 35) of FIG. 5. In the embodiment, only the temperature image (from the temperature detection device 13) is used but not the visual image (from the image capture device 12). Therefore, mapping between the visual image and the temperature image need not be performed. In step 352B, the temperature image may be normalized to catch a recognition area. In one example, a recognition area is caught by removing pixels with temperature being lower than an average temperature in the temperature image. If it determines that the person under recognition wears a mask or glasses, the corresponding area may also be removed.

Subsequently, in step 354, the recognition area is divided into sub-areas (e.g., 5×7 sub-areas). In step 355, a feature area (that includes at least one sub-area) is selected in the temperature image. For example, a sub-area with low temperature in the middle of the temperature image is selected as a feature area covering the nose.

In another example, the recognition area is not divided into rectangular sub-areas in step 354. Instead, the nose may be located in an area with low temperature in the middle of the temperature image, followed by locating left and right eyes in an area with higher temperature above the nose. A feature area (i.e., a triangular area) may be defined by the located nose and eyes (step 355).

Subsequently, in step 356, it compares temperature of the feature area with temperature of at least one neighboring sub-area. Finally, in step 357, if comparing result (of step 356) conforms to predetermined (or normal) facial temperature distribution, the live facial recognition criterion is asserted or conformed.

Figure 8:
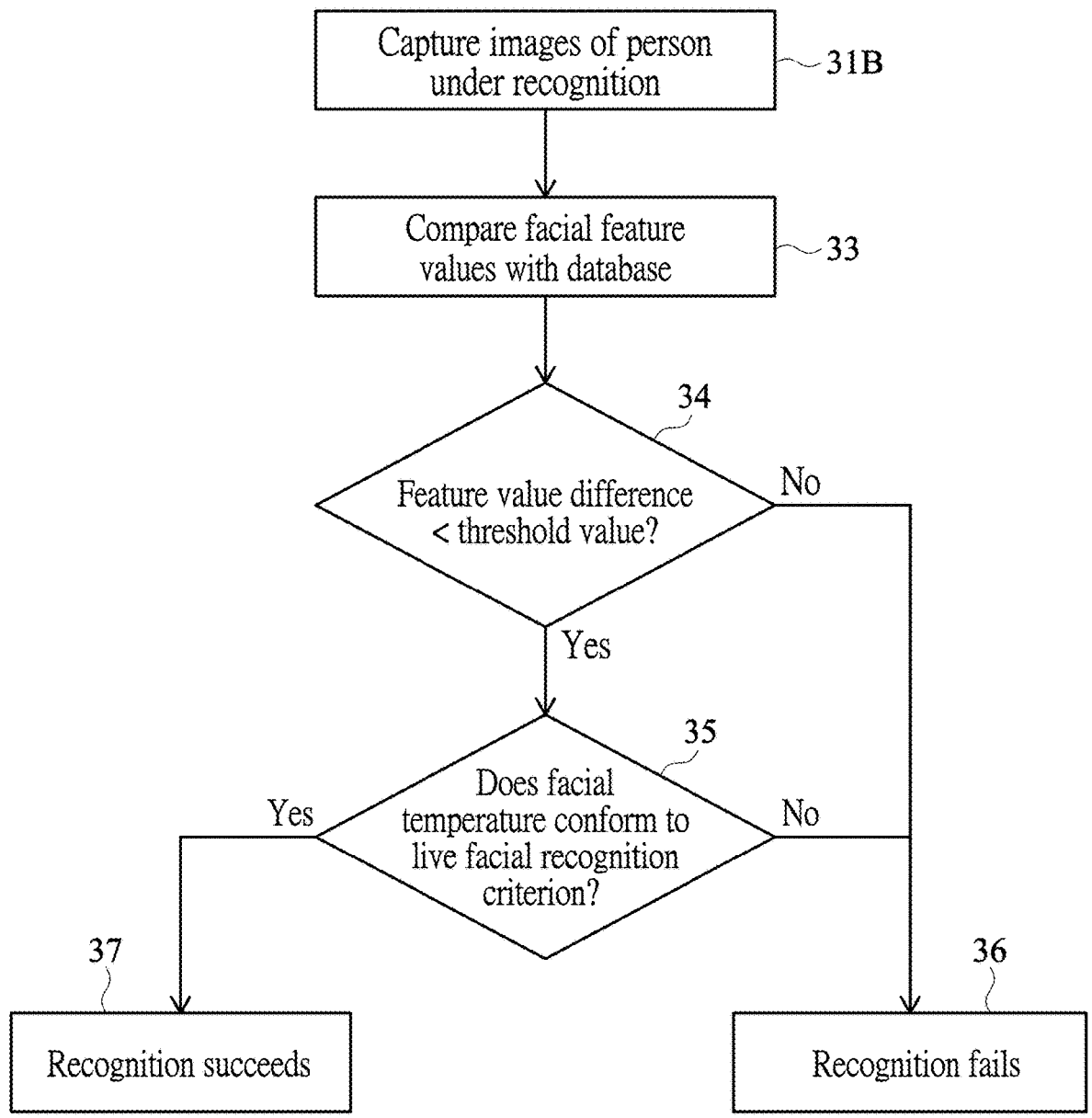
FIG. 8 shows a flow diagram illustrating a live facial recognition method according to a second embodiment of the present invention.

FIG. 8 shows a flow diagram illustrating a live facial recognition method 400 according to a second embodiment of the present invention. The present embodiment is similar to the first embodiment (FIG. 5) but the image capture device 12 and the temperature detection device 13 are integrated, for example, as an RGB-IR camera. Therefore, in step 31B, the visual image and the temperature image (that represents the temperature information) are obtained at the same time. As described above, intensity of an infrared detection value may be transformed into a corresponding temperature.

Subsequently, in step 33, the facial feature values of the person under recognition are compared with a facial feature database (database for short). If a difference between the facial feature values of the person under recognition and corresponding facial feature values of the database is not less than a predetermined threshold value (step 34), indicating that they have substantially different facial features (i.e., a facial feature error is outside an acceptable range), the facial recognition fails (step 36). On the contrary, if a difference between the facial feature values of the person under recognition and corresponding facial feature values of the database is less than the predetermined threshold value (step 34), indicating that they have substantially similar facial features (i.e., a facial feature error is inside an acceptable range), the flow then goes to step 35.

In step 35, it determines whether facial temperature of the person under recognition conforms to a live facial recognition criterion. If the determination of step 35 is negative, the facial recognition fails (step 36); if the determination of step 35 is positive, the facial recognition succeeds (step 37). The live facial recognition criterion of step 35 may be referred to the detailed flow diagram of FIG. 6 or FIG. 7 (but no need of performing mapping of step 351), details of which are omitted for brevity.

Figure 9:
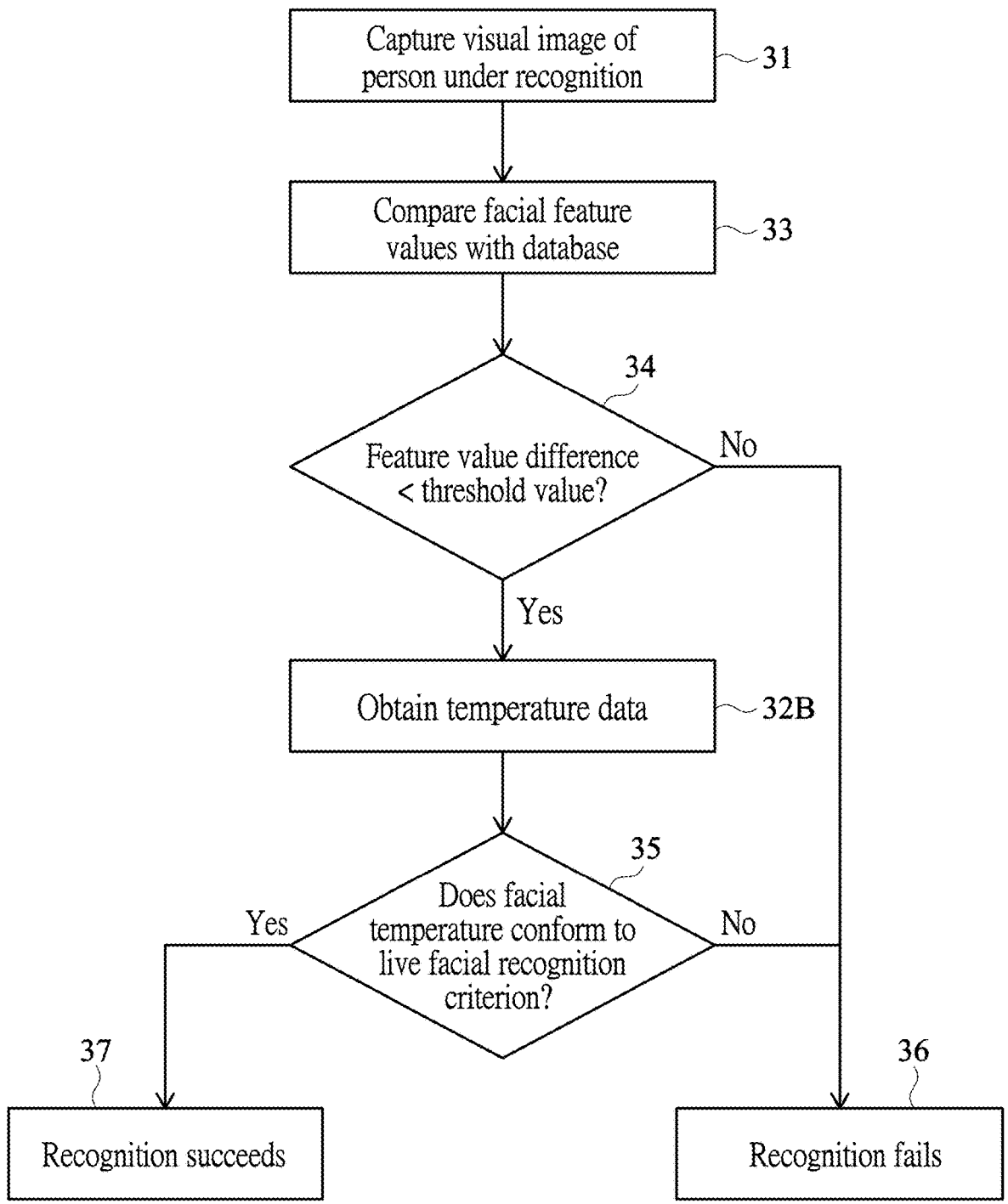
FIG. 9 shows a flow diagram illustrating a live facial recognition method according to a third embodiment of the present invention.

FIG. 9 shows a flow diagram illustrating a live facial recognition method 500 according to a third embodiment of the present invention. The present embodiment is similar to the first embodiment (FIG. 5), in which the image capture device 12 is separate from the temperature detection device 12. Moreover, the temperature detection device 13 in the embodiment may include a single temperature sensor (e.g., an infrared temperature sensor or an infrared thermometer).

In step 31, the image capture device 12 (e.g., a color camera) may capture a visual image (e.g., a color image) of a person under recognition, according to which facial feature values may be obtained. Next, in step 33, the facial feature values of the person under recognition are compared with a facial feature database (database for short). If a difference between the facial feature values of the person under recognition and corresponding facial feature values of the database is not less than a predetermined threshold value (step 34), indicating that they have substantially different facial features (i.e., a facial feature error is outside an acceptable range), the facial recognition fails (step 36). On the contrary, if a difference between the facial feature values of the person under recognition and corresponding facial feature values of the database is less than the predetermined threshold value (step 34), indicating that they have substantially similar facial features (i.e., a facial feature error is inside an acceptable range), the flow then goes to step 32B.

In step 32B, according to facial positions detected in step 31, the temperature sensor (e.g., an infrared temperature sensor or an infrared thermometer) may adopt remote sensing to obtain plural temperature data representing the temperature information at specific points of a face.

In step 35, it determines whether facial temperature of the person under recognition conforms to a live facial recognition criterion. If the determination of step 35 is negative, the facial recognition fails (step 36); if the determination of step 35 is positive, the facial recognition succeeds (step 37). The live facial recognition criterion of step 35 may be referred to the detailed flow diagram of FIG. 7 (but replacing the temperature image with the temperature data), details of which are omitted for brevity.

Although specific embodiments have been illustrated and described, it will be appreciated by those skilled in the art that various modifications may be made without departing from the scope of the present invention, which is intended to be limited solely by the appended claims.

What is claimed is:

1. A live facial recognition method, comprising:
    capturing a visual image and obtaining temperature information of a person under recognition, facial features being derived according to the visual image;
    comparing the facial features of the visual image with corresponding facial features of a facial feature database to obtain a difference therebetween; and
    determining whether facial temperature conforms to a live facial recognition criterion according to the temperature information, if the difference is less than a predetermined threshold value;
    wherein the live facial recognition criterion comprises:
        performing mapping between the visual image and the temperature information;
        normalizing the visual image to catch a recognition area in the visual image;
        catching a corresponding recognition area in the temperature information according to mapping relationship between the visual image and the temperature information;
        dividing the recognition area of the temperature information into a plurality of sub-areas;
        selecting a feature area in the visual image and a corresponding feature area in the temperature information, the feature area of the temperature information including at least one said sub-area;
        comparing temperature of the feature area of the temperature information with temperature of at least one neighboring sub-area; and
        asserting the live facial recognition criterion if comparing result conforms to predetermined facial temperature distribution.

2. The method of claim 1, wherein the predetermined facial temperature distribution comprises one or more of the following requirements:
    facial temperature is higher than ambient temperature;
    temperature above eyes is higher than temperature below the eyes;
    above the eyes, eyebrow temperature is lower than temperature of other area;
    below the eyes, nose temperature is lower than temperature of other area;
    the facial temperature is higher than 28° C.;
    eye temperature is the highest in a face;
    nose temperature is the lowest in the face;
    temperature above nose is higher than temperature below the nose; and
    temperature of the eyes with glasses is lower than other temperature in the face, but higher than the ambient temperature.

3. The method of claim 1, wherein the temperature information comprises a temperature image, the visual image and the temperature image are captured by an image capture device and a temperature detection device respectively, and the image capture device is separate from the temperature detection device.

4. The method of claim 1, wherein the temperature information comprises a temperature image, the visual image and the temperature image are respectively captured by an image capture device and a temperature detection device at a same time, and the image capture device and the temperature detection device are integrated.

5. The method of claim 1, wherein the temperature information comprises plural temperature data, the visual image and the plural temperature data are captured by an image capture device and a temperature detection device respectively, and the temperature detection device includes a single temperature sensor that is separate from the image capture device.

6. The method of claim 5, wherein the temperature sensor obtains the plural temperature data at specific points of a face according to facial positions detected in the visual image.

7. The method of claim 1, wherein the facial feature database is generated by the following steps:
    capturing an image of a person under test, resulting in a captured image;
    performing face detection on the captured image;
    catching a face image from the captured image according to results of the face detection;
    extracting facial features from the face image;
    numericalizing the facial features to generate facial feature values; and
    building a model according to the facial feature values, thereby generating the facial feature database.

8. A live facial recognition method, comprising:
    capturing a visual image and obtaining temperature information of a person under recognition, facial features being derived according to the visual image;
    comparing the facial features of the visual image with corresponding facial features of a facial feature database to obtain a difference therebetween; and
    determining whether facial temperature conforms to a live facial recognition criterion according to the temperature information, if the difference is less than a predetermined threshold value;
    wherein the live facial recognition criterion comprises:
    normalizing a temperature information to catch a recognition area in the temperature information;
    dividing the recognition area into a plurality of sub-areas;
    selecting a feature area in the temperature information, the feature area including at least one said sub-area;
    comparing temperature of the feature area of the temperature information with temperature of at least one neighboring sub-area; and
    asserting the live facial recognition criterion if comparing result conforms to predetermined facial temperature distribution.

9. The method of claim 8, wherein the predetermined facial temperature distribution comprises one or more of the following requirements:
    facial temperature is higher than ambient temperature;

temperature above eyes is higher than temperature below the eyes;
above the eyes, eyebrow temperature is lower than temperature of other area;
below the eyes, nose temperature is lower than temperature of other area;
the facial temperature is higher than 28° C.;
eye temperature is the highest in a face;
nose temperature is the lowest in the face;
temperature above nose is higher than temperature below the nose; and
temperature of the eyes with glasses is lower than other temperature in the face, but higher than the ambient temperature.

10. A live facial recognition system, comprising:
a processor;
an image capture device that is controlled by the processor to capture a visual image of a person under recognition, facial features being derived according to the visual image;
a temperature detection device that is controlled by the processor to obtain temperature information of the person under recognition; and
a storage device that stores a facial feature database;
wherein the processor compares the facial features of the visual image with corresponding facial features of the facial feature database to obtain a difference therebetween; and the processor determines whether facial temperature conforms to a live facial recognition criterion according to the temperature information, if the difference is less than a predetermined threshold value;
wherein the live facial recognition criterion comprises:
performing mapping between the visual image and the temperature information;
normalizing the visual image to catch a recognition area in the visual image;
catching a corresponding recognition area in the temperature information according to mapping relationship between the visual image and the temperature information;
dividing the recognition area of the temperature information into a plurality of sub-areas;
selecting a feature area in the visual image and a corresponding feature area in the temperature information, the feature area of the temperature information including at least one said sub-area;
comparing temperature of the feature area of the temperature information with temperature of at least one neighboring sub-area; and
asserting the live facial recognition criterion if comparing result conforms to predetermined facial temperature distribution.

11. The system of claim 10, further comprising a memory unit that stores a computer program, by which the processor performs live facial recognition.

12. The system of claim 10, wherein the predetermined facial temperature distribution comprises one or more of the following requirements:
facial temperature is higher than ambient temperature;
temperature above eyes is higher than temperature below the eyes;
above the eyes, eyebrow temperature is lower than temperature of other area;
below the eyes, nose temperature is lower than temperature of other area;
the facial temperature is higher than 28° C.;
eye temperature is the highest in a face;
nose temperature is the lowest in the face;
temperature above nose is higher than temperature below the nose; and
temperature of the eyes with glasses is lower than other temperature in the face, but higher than the ambient temperature.

13. The system of claim 10, wherein the image capture device is separate from the temperature detection device, and the temperature detection device obtains a temperature image representing the temperature information.

14. The system of claim 10, wherein the image capture device and the temperature detection device are integrated, and respectively capture the visual image and a temperature image at a same time, the temperature image representing the temperature information.

15. The system of claim 10, wherein the image capture device is separate from the temperature detection device, and the temperature detection device includes a single temperature sensor.

16. The system of claim 15, wherein the temperature sensor obtains plural temperature data at specific points of a face according to facial positions detected in the visual image, the plural temperature data representing the temperature information.

17. A live facial recognition system, comprising:
a processor;
an image capture device that is controlled by the processor to capture a visual image of a person under recognition, facial features being derived according to the visual image;
a temperature detection device that is controlled by the processor to obtain temperature information of the person under recognition; and
a storage device that stores a facial feature database;
wherein the processor compares the facial features of the visual image with corresponding facial features of the facial feature database to obtain a difference therebetween; and the processor determines whether facial temperature conforms to a live facial recognition criterion according to the temperature information, if the difference is less than a predetermined threshold value;
wherein the live facial recognition criterion comprises:
normalizing a temperature information to catch a recognition area in the temperature information;
dividing the recognition area into a plurality of sub-areas;
selecting a feature area in the temperature information, the feature area including at least one said sub-area;
comparing temperature of the feature area of the temperature information with temperature of at least one neighboring sub-area; and
asserting the live facial recognition criterion if comparing result conforms to predetermined facial temperature distribution.

18. The system of claim 17, wherein the predetermined facial temperature distribution comprises one or more of the following requirements:
facial temperature is higher than ambient temperature;
temperature above eyes is higher than temperature below the eyes;
above the eyes, eyebrow temperature is lower than temperature of other area;
below the eyes, nose temperature is lower than temperature of other area;
the facial temperature is higher than 28° C.;
eye temperature is the highest in a face;
nose temperature is the lowest in the face;

temperature above nose is higher than temperature below the nose; and temperature of the eyes with glasses is lower than other temperature in the face, but higher than the ambient temperature.

* * * * *